United States Patent [19]

Li

[11] Patent Number: 5,456,135
[45] Date of Patent: Oct. 10, 1995

[54] BICYCLE HANDLEBAR ASSEMBLY WITH AXIALLY ROTATABLE HANDLEBAR UNIT

[76] Inventor: Min-Tsung Li, No. 2, Hsi-Chien Lane, Chin-Tun Tsun, Hua-Tan Hsiang, Chang-Hua Hsien, Taiwan

[21] Appl. No.: 245,687

[22] Filed: May 18, 1994

[51] Int. Cl.⁶ .................................................. B62K 21/16
[52] U.S. Cl. .................... 74/551.7; 74/551.3; 74/551.1; 74/551.6; 403/103; 403/325
[58] Field of Search ............................... 74/551.1–551.8; 280/279, 280; 403/322, 325, 103

[56] References Cited

U.S. PATENT DOCUMENTS

| | | | |
|---|---|---|---|
| 540,879 | 11/1895 | Sefton | 74/551.7 |
| 596,814 | 1/1898 | King | 74/551.7 |
| 610,736 | 9/1898 | Dieterich | 74/551.7 |
| 645,884 | 3/1900 | Blashfield | 74/551.4 |
| 647,366 | 4/1900 | Blaker | 74/551.4 |
| 4,479,646 | 10/1984 | Chirapozu | 74/551.8 X |
| 4,794,828 | 1/1989 | Olson | 403/325 X |
| 5,138,900 | 8/1992 | Hals | 74/551.7 |
| 5,323,664 | 6/1994 | Fairfield et al. | 74/551.3 |
| 5,326,186 | 7/1994 | Nyberg | 403/325 X |

FOREIGN PATENT DOCUMENTS

| | | | |
|---|---|---|---|
| 4224374 | 1/1993 | Germany | 74/551.8 |
| 10888 | 5/1899 | Sweden | 74/551.6 |
| 13899 | 6/1910 | United Kingdom | 74/551.6 |
| 2406 | 7/1910 | United Kingdom | 74/551.6 |

Primary Examiner—Vinh T. Luong
Attorney, Agent, or Firm—Ladas & Parry

[57] ABSTRACT

A bicycle handlebar assembly includes a stem unit and a handlebar unit. The stem unit includes an upright tube which has a top end that is formed with a forwardly extending elongated prop. The prop has a distal front end which is formed with a horizontally disposed tubular connector. The tubular connector has an axis which is transverse to the prop. The handlebar unit includes a handlebar which extends through the tubular connector and which is retained rotatably thereat. The handlebar includes an intermediate tube portion and two end tube portions mounted on two ends of the intermediate tube portion. The intermediate tube portion has an outer wall surface formed with a plurality of angularly spaced engaging grooves that are accessed via a radial hole in the tubular connector. Each of the end tube portions has an auxiliary handle mounted thereon. A spring-loaded locking unit includes a locking rod and a biasing unit which biases the locking rod to extend into the tubular connector via the radial hole so as to engage releasably one of the engaging grooves in the intermediate tube portion. A lever unit is coupled operatively to the locking rod and is operable so as to pull the locking rod to disengage the intermediate tube portion against action of the biasing unit.

9 Claims, 6 Drawing Sheets

BICYCLE HANDLEBAR ASSEMBLY WITH AXIALLY ROTATABLE HANDLEBAR UNIT

BACKGROUND OF THE INVENTION

1. Field of the Invention

The invention relates to a bicycle handlebar assembly, more particularly to a bicycle handlebar assembly with an axially rotatable handlebar unit to facilitate adjustments in the inclination of a pair of auxiliary handles that are mounted on the handlebar unit.

2. Description of the Related Art

Figure 1:
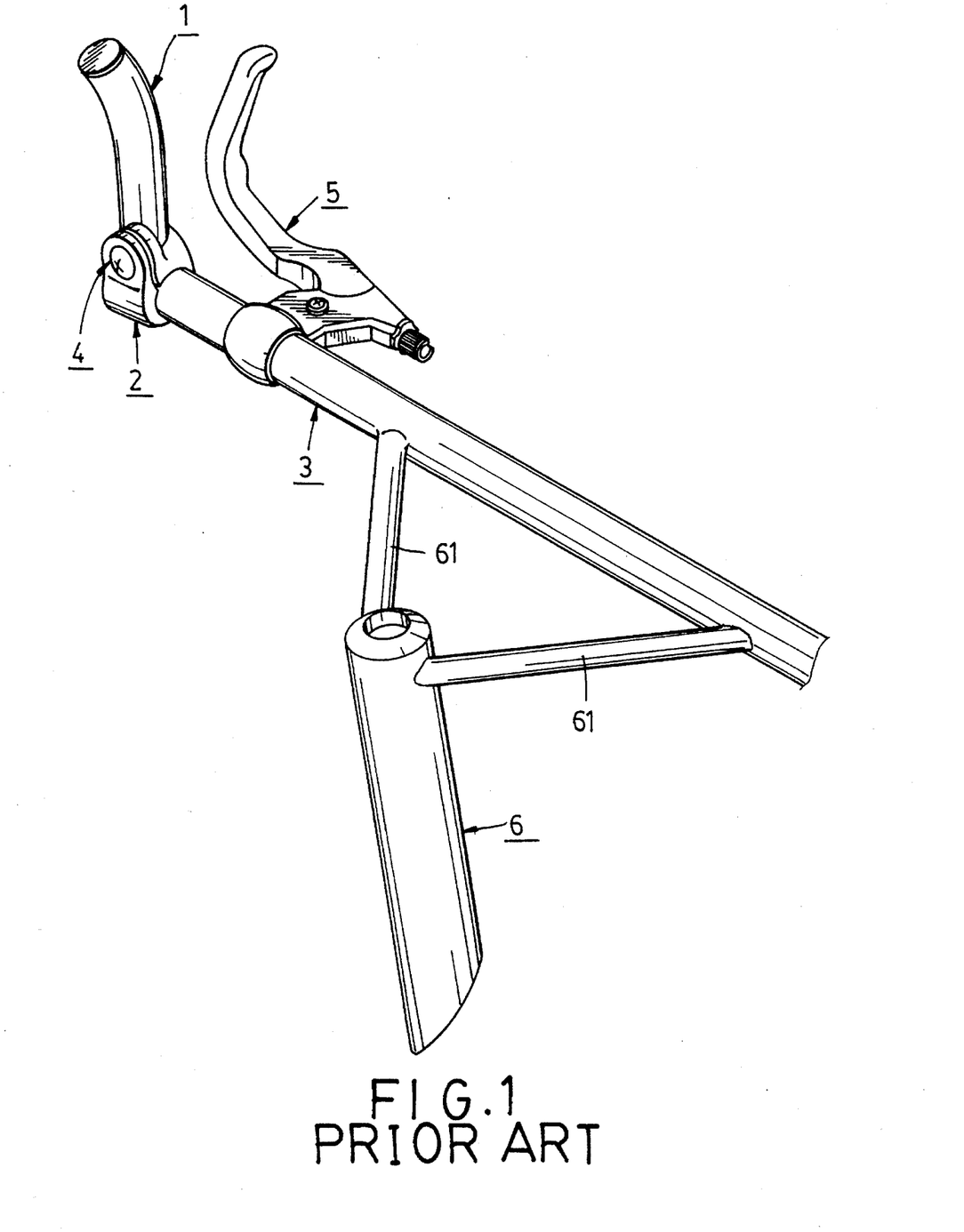
FIG. 1 is a fragmentary perspective view of a conventional bicycle handlebar assembly.

Referring to FIG. 1, a conventional bicycle handlebar assembly is shown to comprise an upright stem 6 and a horizontal handlebar unit 3 which is connected integrally to a top end of the upright stem 6 by means of connecting ribs 61. An auxiliary handle 1 is mounted on each end of the handlebar unit 3 (only one end of the handlebar unit 3 is shown) by means of a mounting seat 2 which is sleeved on the respective end of the handlebar unit 3. A screw fastener 4 is employed to retain the auxiliary handle 1 on the respective mounting seat 2. It is noted that adjustments in the inclination of the auxiliary handle 1 relative to the handlebar unit 3 are sometimes necessary in order to suit the terrain conditions and the body dimensions of the user. When performing such adjustments, the screw fastener 4 is loosened, and the auxiliary handle 1 is then pivoted on the mounting seat 2. The screw fastener 4 is tightened after the auxiliary handle 1 has been adjusted to the desired inclination.

The disadvantages of using the above-described conventional bicycle handlebar assembly are as follows:

1. The inclination of the auxiliary handle 1 is inconvenient to adjust because of the need to loosen and then tighten the screw fastener 4 and because of the need for using a tool, such as a wrench or a screwdriver, when loosening and tightening the screw fastener 4.

2. After the inclination of the auxiliary handle 1 has been adjusted, the position of the auxiliary handle 1 relative to a brake lever 5 on the handlebar unit 3 is changed from an ideal position. Thus, there is also a need to adjust the position of the brake lever 5 so as to correspond with that of the auxiliary handle 1.

SUMMARY OF THE INVENTION

Therefore, the objective of the present invention is to provide an improved bicycle handlebar assembly which can overcome the drawbacks commonly associated with the prior art.

More particularly, the objective of the present invention is to provide a bicycle handlebar assembly with an axially rotatable handlebar unit to facilitate adjustments in the inclination of auxiliary handles that are mounted on the handlebar unit.

Accordingly, the bicycle handlebar assembly of the present invention comprises:

a stem unit including an upright tube which has a top end that is formed with a forwardly extending elongated prop, the prop having a distal front end which is formed with a horizontally disposed tubular connector, the tubular connector having an axis which is transverse to the prop and a bottom portion which is formed with a radial hole;

a handlebar unit including a handlebar which extends through the tubular connector and which is retained rotatably thereat, the handlebar including an intermediate tube portion and two end tube portions mounted on two ends of the intermediate tube portion, the intermediate tube portion having a wide section and a pair of restricted end sections which extend from two ends of the wide section, each of the restricted end sections extending fittingly into a respective one of the end tube portions, the wide section of the intermediate tube portion having an outer wall surface formed with a plurality of angularly spaced engaging grooves that are accessed via the radial hole in the tubular connector, each of the end tube portions having an auxiliary handle and a brake lever mounted thereon;

a spring-loaded locking unit including: a hollow positioning seat with an open top aligned with the radial hole in the tubular connector and a bottom wall formed with an opening, the positioning seat being secured on the tubular connector; a locking rod disposed in the positioning seat and having a shank portion which has an upper end and a lower end that extends slidably through the opening in the bottom wall of the positioning seat, an enlarged head portion which is formed on the upper end of the shank portion, and a locking projection which is formed on a top surface of the head portion and which has a shape that complements the engaging grooves; and a biasing unit provided around the shank portion and disposed in the positioning seat between the head portion of the locking rod and the bottom wall of the positioning seat, the biasing unit biasing the locking rod such that the locking projection extends into the tubular connector via the radial hole to engage releasably one of the engaging grooves of the intermediate tube portion; and a lever unit coupled operatively to the shank portion of the locking rod and operable so as to pull the locking rod to disengage the locking projection from said one of the engaging grooves against action of the biasing unit, thereby permitting axial rotation of the handlebar to adjust an inclination of the auxiliary handle on each of the end tube portions.

The handlebar unit further comprises a pair of ring bearings, a retaining sleeve and a pair of sealing rings. Each of the ring bearings is sleeved on a respective one of the end tube portions and is disposed adjacent to the wide section of the intermediate tube portion. The retaining sleeve is sleeved over the ring bearings and covers the wide section of the intermediate tube portion. The ring bearings mount rotatably the end tube portions to the retaining sleeve. The retaining sleeve extends fittingly through the tubular connector and has a bottom portion which is formed with an opening that is aligned with the radial hole in the tubular connector. Each of the sealing rings is provided around a respective one of the end tube portions adjacent to a corresponding one of the ring bearings. The sealing rings are in tight contact with an interior wall surface of the retaining sleeve to prevent dust and rain water from accumulating in the retaining sleeve.

The lever unit comprises a lever support which extends downwardly from the prop, a control lever which is mounted pivotally to the lower end of the lever support and which has a connecting end, a generally U-shaped pivot seat, and a connecting string. The pivot seat has a pair of pivot ears which are connected pivotally to the lower end of the shank portion of the locking rod and a connecting plate which interconnects lower ends of the pivot ears. The connecting string has a first end which is connected to the connecting plate of the pivot seat and a second end which is connected to the connecting end of the control lever.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 2:
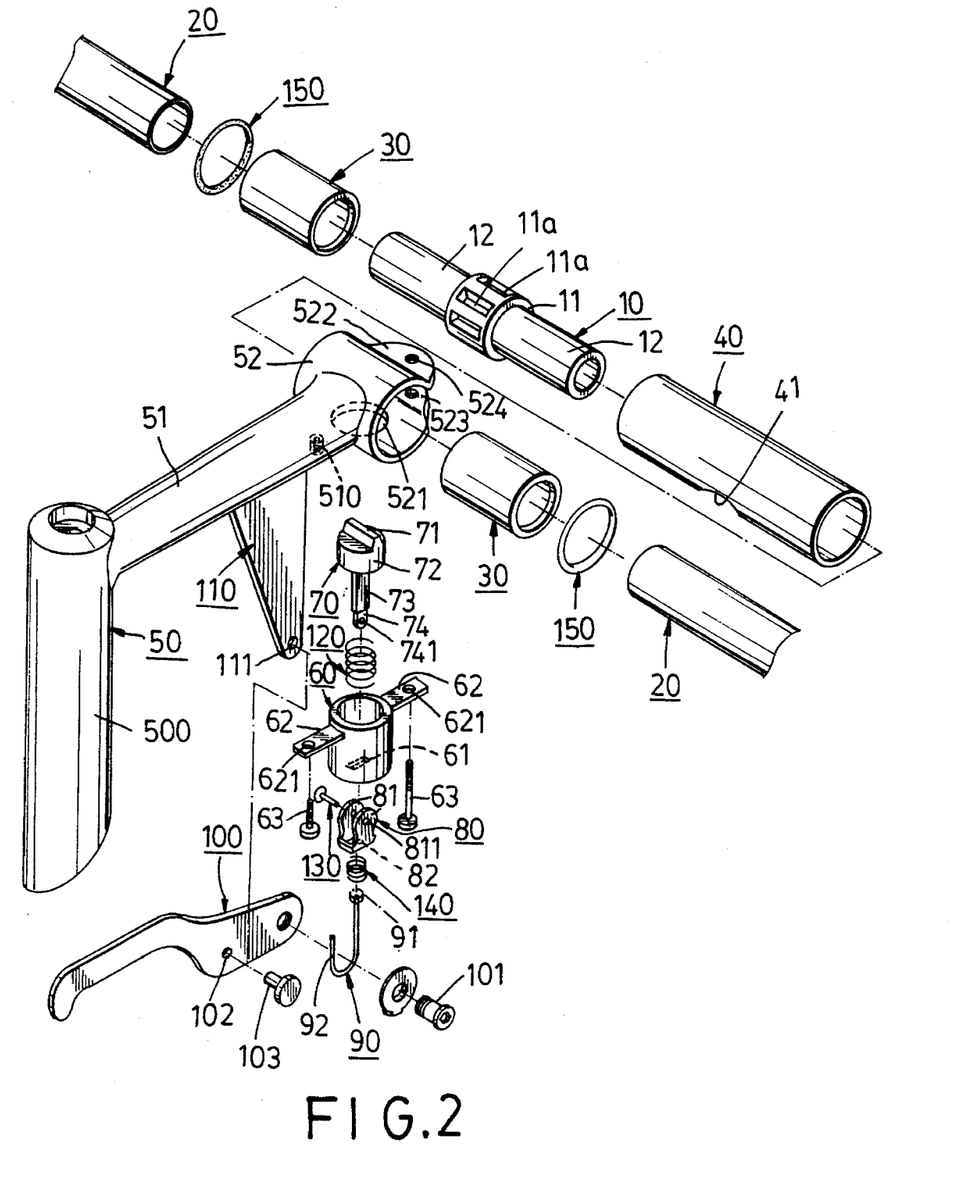
FIG. 2 is a fragmentary exploded view of the preferred embodiment of a bicycle handlebar assembly according to the present invention.
Figure 3:
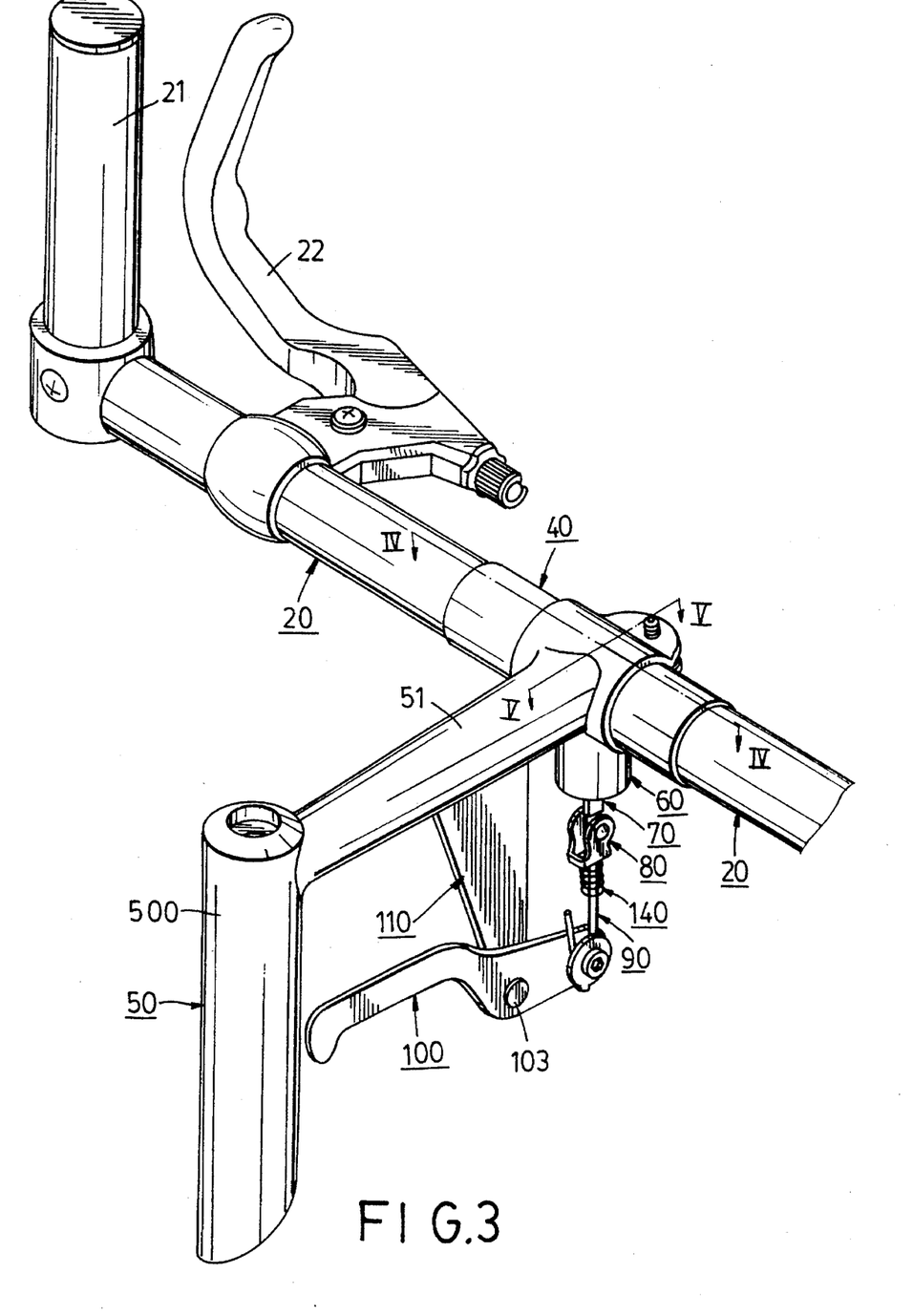
FIG. 3 is a fragmentary perspective view of the preferred embodiment.

Referring to FIGS. 2 and 3, the preferred embodiment of a bicycle handlebar assembly according to the present invention is shown to comprise a stem unit 50, a handlebar unit, a spring-loaded locking unit and a lever unit.

The stem unit 50 includes an upright tube 500 which has a top end that is formed with a forwardly extending elongated prop 51. The prop 51 has a distal front end which is provided with a horizontally disposed tubular connector 52. The tubular connector 52 has an axis which is transverse to the prop 51, a bottom portion which is formed with a radial hole 521, and a front portion which is formed with an axially extending slit 523 and a pair of forwardly extending lugs 522 on two sides of the slit 523. The lugs 522 are formed with aligned threaded holes 524. The prop 51 further has a bottom side formed with a threaded blind bore 510 adjacent to the tubular connector 52.

Figure 4:
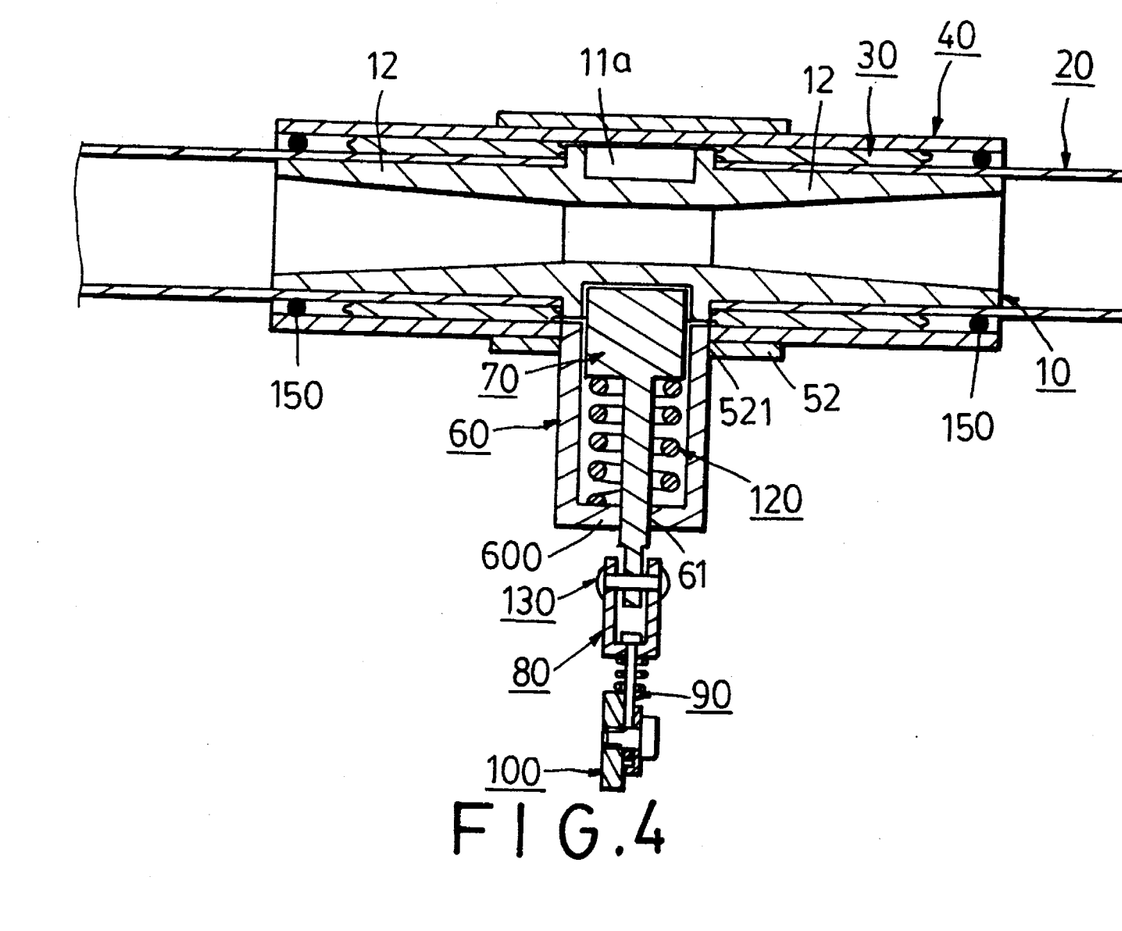
FIG. 4 is a sectional view of the preferred embodiment taken along line IV—IV in FIG. 3.

The handlebar unit comprises a handlebar which includes an intermediate tube portion 10 and two end tube portions 20. The intermediate tube portion 10 has a wide section 11 with an outer wall surface which is formed with a plurality of angularly spaced and axially extending engaging grooves 11a, and a pair of restricted end sections 12 which extend from two ends of the wide section 11. The interior of each of the end sections 12 tapers gradually toward the wide section 11, as shown in FIG. 4. Each of the end sections 12 extends fittingly into a respective one of the end tube portions 20. Each of the end tube portions 20 has an auxiliary handle 21 and a brake lever 22 mounted thereon, as shown in FIG. 3.

The handlebar unit further comprises a pair of ring bearings 30, a tubular retaining sleeve 40, and a pair of sealing rings 150. Each of the ring bearings 30 is sleeved on a respective one of the end tube portions 20 and is disposed adjacent to the wide section 11 of the intermediate tube portion 10. In this embodiment, the ring bearings 30 are self-lubricating bearings. The retaining sleeve 40 is sleeved over the ring bearings 30 and covers the wide section 11 of the intermediate tube portion 10. The ring bearings 30 mount rotatably the end tube portions 20 to the retaining sleeve 40. The retaining sleeve 40 extends fittingly through the tubular connector 52 and has a bottom portion which is formed with an opening 41 that is aligned with the radial hole 521 in the tubular connector 52. The engaging grooves 11a in the wide section 11 of the intermediate tube portion 10 are thus accessible via the opening 41 and the radial hole 521. Each of the sealing rings 150 is provided around a respective one of the end tube portions 20 adjacent to a corresponding one of the ring bearings 30 prior to assembly of the retaining sleeve 40. The sealing rings 150 serve to prevent dust and rain water from accumulating in the retaining sleeve 40.

The spring-loaded locking unit comprises a hollow positioning seat 60, a locking rod 70, and a biasing unit 120.

The positioning seat 60 is in the form of an upright hollow cylinder and has an open top which is aligned with the radial hole 521 in the tubular connector 52, and a bottom wall 600 which is formed with a rectangular opening 61, as shown in FIG. 4. The positioning seat 60 is further provided with a pair of diametrically opposite mounting arms 62 which extend outwardly and radially adjacent to the open top thereof. Each of the mounting arms 62 is formed with a threaded hole 621. A pair of screws 63 engage threadedly the threaded holes 621 in the mounting arms 62, the blind bore 510 in the prop 51 and the aligned threaded holes 524 of the lugs 522, thereby securing the positioning seat 60 on the tubular connector 52.

The locking rod 70 is disposed in the positioning seat 60 and has a slender shank portion 73 with a rectangular cross-section, an enlarged head portion 72 formed on an upper end of the shank portion 73, and a tapered locking projection 71 which is formed on a top surface of the head portion 72 and which has a shape that complements the engaging grooves 11a. The shank portion 73 has a lower end section 74 that extends slidably through the rectangular opening 61 in the bottom wall 600 of the positioning seat 60 and that is formed with a pin hole 741. In this embodiment, the biasing unit 120 is a coiled compression spring which is provided around the shank portion 73 and which is disposed in the positioning seat 60 between the enlarged head portion 72 of the locking rod 70 and the bottom wall 600 of the positioning seat 60. The biasing unit 120 serves to bias the locking rod 70 such that the locking projection 71 thereof extends into the radial hole 521 in the tubular connector 52 and the opening 41 in the retaining sleeve 40 to engage releasably one of the engaging grooves 11a in the wide section 11 of the intermediate tube portion 10.

The lever unit comprises a lever support 110, a control lever 100, a pivot seat 80, a connecting string 90, and a spring unit 140.

The lever support 110 extends downwardly from the prop 51 and is disposed between the blind bore 510 and the upright tube 500. The lever support 110 is shaped as a triangular plate and has a lower end that is formed with a mounting hole 111.

The control lever 100 is formed with a mounting hole 102 that is aligned with the mounting hole 111 in the lever support 110. A fastener 103 extends through the mounting holes 102, 111 to mount pivotally the control lever 100 to the lower end of the lever support 110.

The pivot seat 80 is a generally U-shaped body which includes a pair of pivot ears 81 disposed on two sides of the lower end section 74 of the shank portion 73 of the locking rod 70 and formed with a respective pin hole 811. A connecting plate interconnects lower ends of the pivot ears 81 and is formed with a through hole 2. The pin holes 811 of the pivot ears 81 are aligned with the pin hole 741 in the lower end section 74 of the shank portion 73. A fastener 130, such as a rivet, extends through the aligned pin holes 741, 811 to mount pivotally the pivot seat 80 on the lower end section 74 of the shank portion 73.

The connecting string 90 has a first end 91 which engages the through hole 82 in the connecting plate of the pivot seat 80 and a second end 92 which extends through the through hole 82 and which is connected to a connecting end of the control lever 100 by means of a screw fastener 101.

The spring unit 140, such as a coiled compression spring, is provided between the connecting plate of the pivot seat 80 and the connecting end of the control lever 100 and is disposed around a portion of the connecting string 90. The spring unit 140 serves to position the control lever 100 after the latter is operated.

Figure 5:
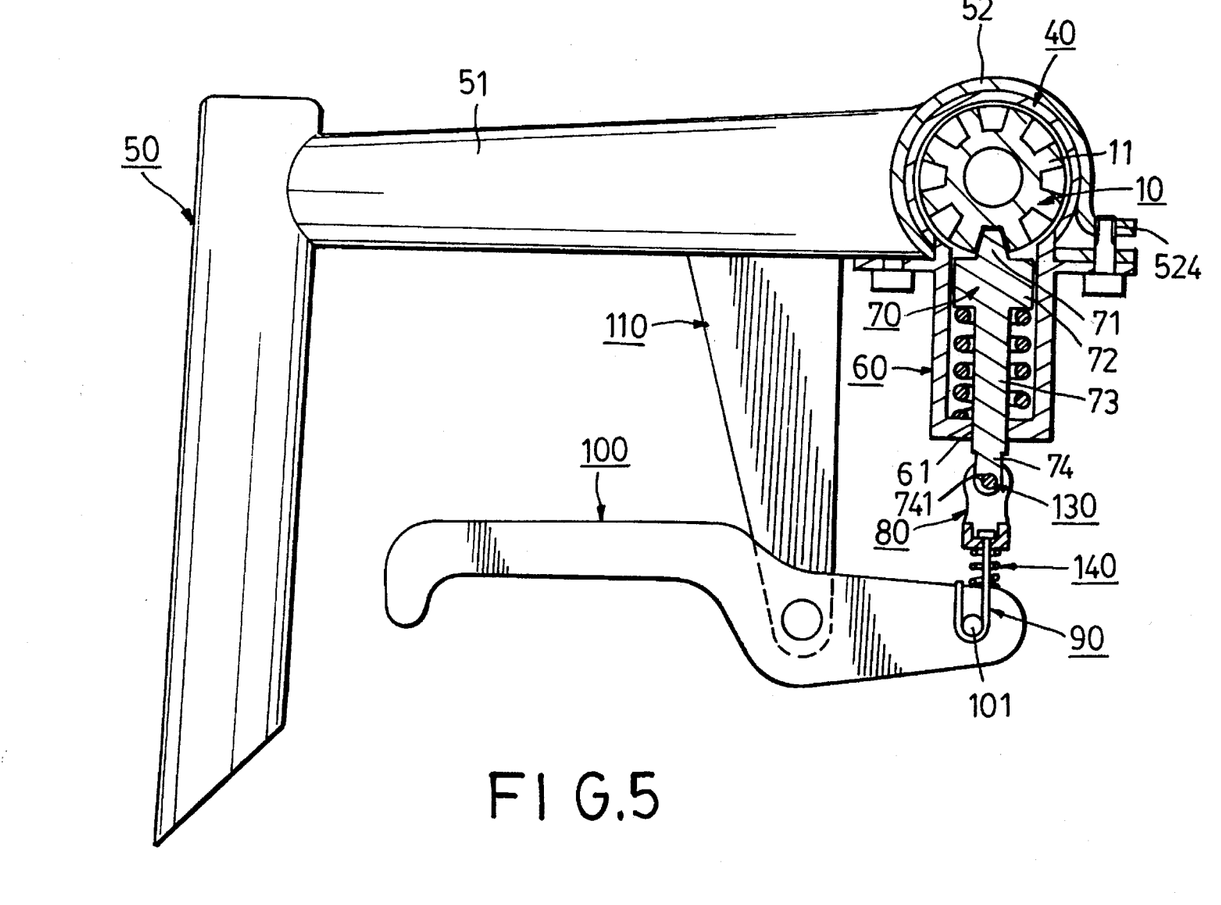
FIG. 5 is a sectional view of the preferred embodiment taken along line V—V in FIG. 3.
Figure 6:
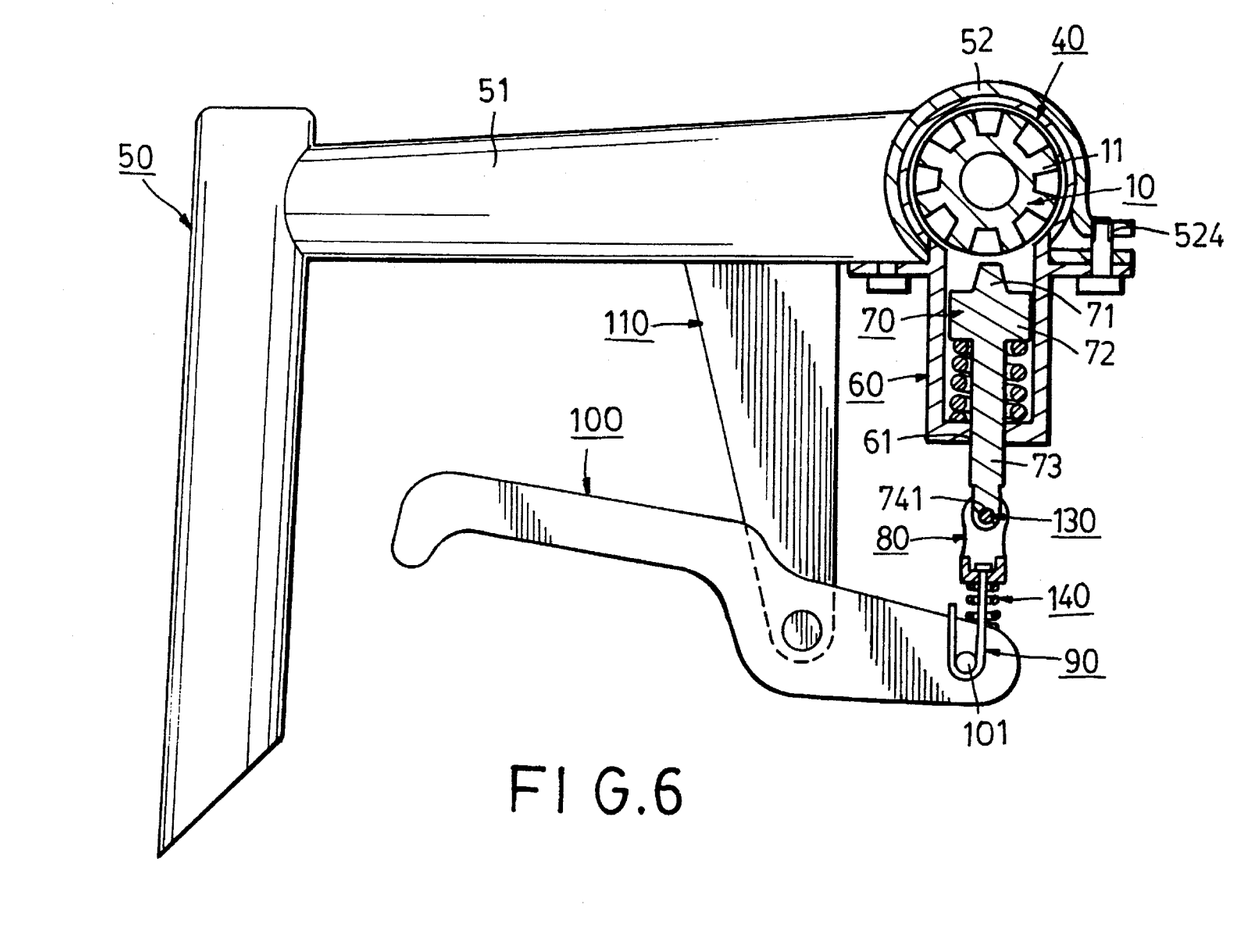
FIG. 6 is another sectional view of the preferred embodiment to illustrate the latter when in an adjustable state.

Referring to FIGS. 3, 5 and 6, when it is desired to adjust the inclination of the auxiliary handles 21 on the handlebar unit, the control lever 100 is operated so as to pull the connecting string 90 to retract correspondingly the locking rod 70 into the positioning seat 60 against the action of the biasing unit 120, thereby disengaging the locking projection 71 from one of the engaging grooves 11a in the wide section 11 of the intermediate tube portion 10. After the handlebar has been rotated axially relative to the retaining sleeve 40 so as to dispose the auxiliary handles 21 in the desired inclination, the control lever 100 is released, thereby causing the biasing unit 120 to expand to enable the locking projection 71 to once more engage one of the engaging grooves 11a in the wide section 11 of the intermediate tube portion 10.

Referring once more to FIG. 3, the ring bearings 30 are easy to maintain because self-lubricating bearings are employed. Further, it is noted that the shape of the positioning seat 60 should not be limited to a hollow cylinder since a hollow rectangular body may also be used to achieve the same effect. The opening 61 in the bottom wall 600 of the positioning seat 60 and the shank portion 73 of the locking rod 70 are rectangular in order to prevent misalignment of the locking rod 70 relative to the engaging grooves 11a when the control lever 100 is operated. It is noted that the opening 61 in the bottom wall 600 of the positioning seat 60 and the shank portion 73 of the locking rod 70 may be formed in other shapes, such as a triangle or an oblong, as long as the same effect can be achieved.

Referring again to FIG. 2, it is noted that the locking projection 71 is tapered, while the engaging grooves 11a complement the shape of the locking projection 71. The shape of the locking projection 71 may be varied as long as the engaging grooves 11a complement the latter.

The advantages of using the bicycle handlebar assembly of the present invention are as follows:

1. The inclination of the auxiliary handle 21 is easy and convenient to adjust. Operation of the control lever 100 permits axial rotation of the handlebar so as to vary the inclination of the auxiliary handle 21. No tools are required when performing the adjustment procedure.

2. Since the brake lever 22 rotates with the auxiliary handle 21 when adjusting the inclination of the latter, there is no need to adjust the position of the brake lever 22 relative to the auxiliary handle 21.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A bicycle handlebar assembly, comprising:
   a stem unit including an upright tube which has a top end that is formed with a forwardly extending elongated prop, said prop having a distal front end which is formed with a horizontally disposed tubular connector, said tubular connector having an axis which is transverse to said prop and a bottom portion which is formed with a radial hole;
   a handlebar unit including a handlebar which extends through said tubular connector and which is retained rotatably thereat, said handlebar including an intermediate tube portion and two end tube portions mounted on two ends of said intermediate tube portion, said intermediate tube portion having an outer wall surface formed with a plurality of angularly spaced engaging grooves that are accessed via said radial hole in said tubular connector, each of said end tube portions having an auxiliary handle mounted thereon;
   a spring-loaded locking unit including: a hollow positioning seat with an open top aligned with said radial hole in said tubular connector and a bottom wall formed with an opening, said positioning seat being secured on said tubular connector; a locking rod disposed in said positioning seat and having a shank portion which has an upper end and a lower end that extends slidably through said opening in said bottom wall of said positioning seat, an enlarged head portion which is formed on said upper end of said shank portion and a locking projection which is formed on a top surface of said head portion and which has a shape that complements said engaging grooves; and a biasing unit provided around said shank portion and disposed in said positioning seat between said head portion of said locking rod and said bottom wall of said positioning seat, said biasing unit biasing said locking rod such that said locking projection extends into said tubular connector via said radial hole to engage releasably one of said engaging grooves of said intermediate tube portion; and
   a lever unit coupled operatively to said shank portion of said locking rod and operable so as to pull said locking rod to disengage said locking projection from said one of said engaging grooves against action of said biasing unit, thereby permitting axial rotation of said handlebar to adjust an inclination of said auxiliary handle on each of said end tube portions.

2. The bicycle handlebar assembly as claimed in claim 1, wherein each of said end tube portions further has a brake lever mounted thereon.

3. The bicycle handlebar assembly as claimed in claim 1, wherein said intermediate tube portion has a wide section and a pair of restricted end sections which extend from two ends of said wide section, said engaging grooves being formed on an outer wall surface of said wide section, each of said restricted end sections extending fittingly into a respective one of said end tube portions.

4. The bicycle handlebar assembly as claimed in claim 3, wherein said handlebar unit further comprises:
   a pair of ring bearings, each of which being sleeved on a respective one of said end tube portions and being disposed adjacent to said wide section of said intermediate tube portion; and
   a retaining sleeve sleeved over said ring bearings and covering said wide section of said intermediate tube portion, said ring bearings mounting rotatably said end tube portions to said retaining sleeve, said retaining sleeve extending fittingly through said tubular connector and having a bottom portion which is formed with an opening that is aligned with said radial hole in said tubular connector.

5. The bicycle handlebar assembly as claimed in claim 4, wherein said ring bearings are self-lubricating bearings.

6. The bicycle handlebar assembly as claimed in claim 4, wherein said handlebar unit further comprises a pair of sealing rings, each of which being provided around a respective one of said end tube portions adjacent to a corresponding one of said ring bearings, said sealing rings being in tight contact with an interior wall surface of said retaining sleeve.

7. The bicycle handlebar assembly as claimed in claim 1, wherein said lever unit comprises:

- a lever support which extends downwardly from said prop and which has a lower end;
- a control lever which is mounted pivotally to said lower end of said lever support and which has a connecting end;
- a generally U-shaped pivot seat having a pair of pivot ears which are connected pivotally to said lower end of said shank portion of said locking rod and a connecting plate which interconnects lower ends of said pivot ears; and
- a connecting string having a first end which is connected to said connecting plate of said pivot seat and a second end which is connected to said connecting end of said control lever.

8. The bicycle handlebar assembly as claimed in claim 7, wherein said lever unit further comprises a spring unit provided between said connecting plate of said pivot seat and said connecting end of said control lever for positioning said control lever.

9. The bicycle handlebar assembly as claimed in claim 1, wherein said engaging grooves extend axially and said locking projection of said locking rod has a tapered cross-section.

* * * * *